No. 640,727. Patented Jan. 2, 1900.
F. R. WILEY.
ELEMENT FOR ELECTRIC BATTERIES.
(Application filed May 13, 1898.)
(Specimens.) 2 Sheets—Sheet 1.
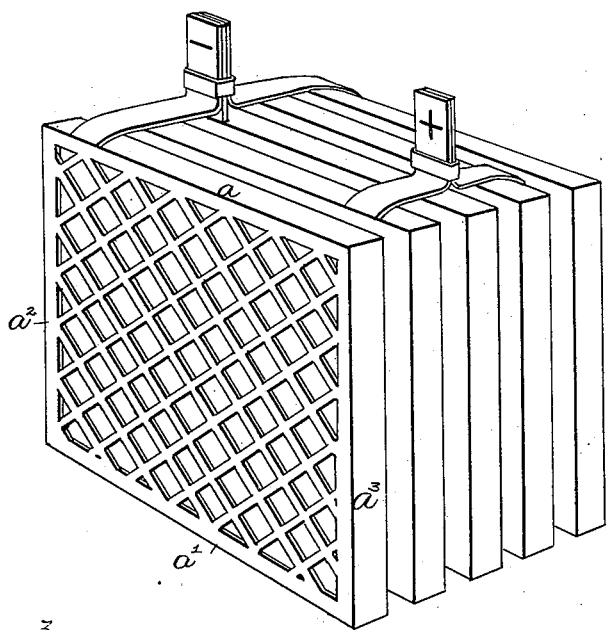
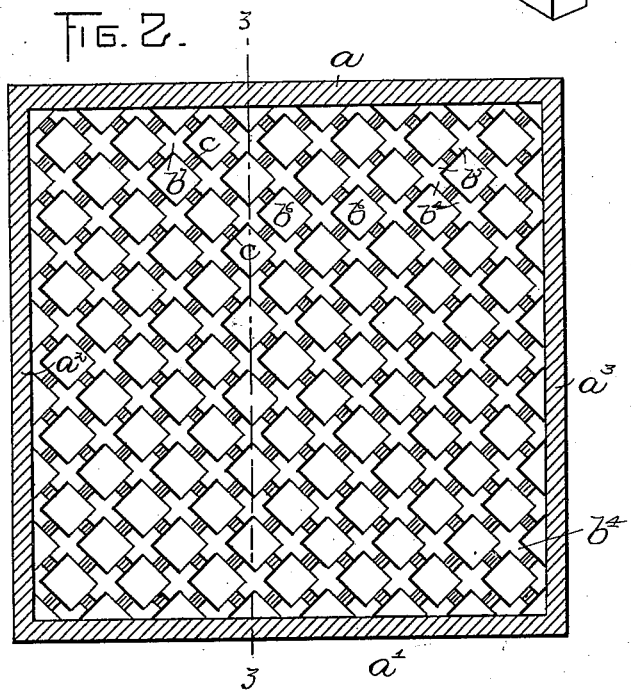
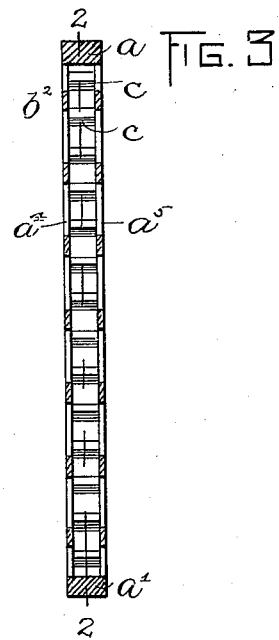
WITNESSES:
INVENTOR:
Frank R. Wiley
THE NORRIS PETERS CO., PHOTO-LITHO., WASHINGTON, D. C.

No. 640,727. Patented Jan. 2, 1900.
F. R. WILEY.
ELEMENT FOR ELECTRIC BATTERIES.
(Application filed May 13, 1898.)
(Specimens.) 2 Sheets—Sheet 2.
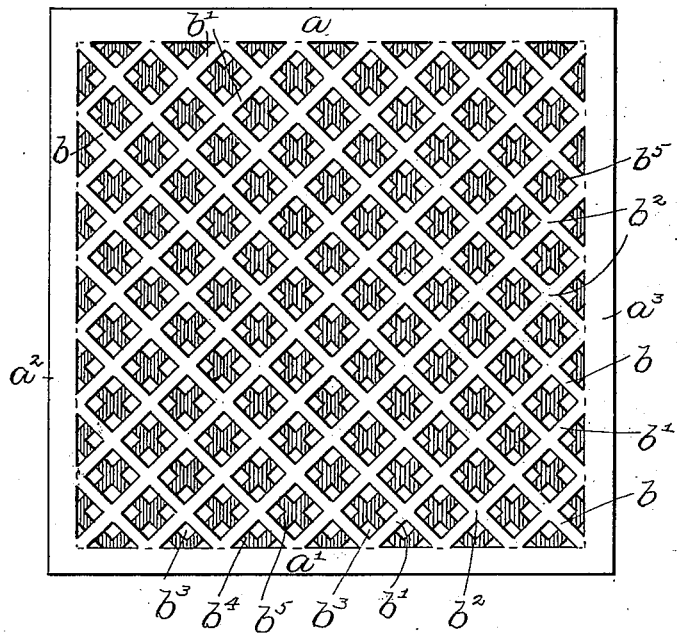
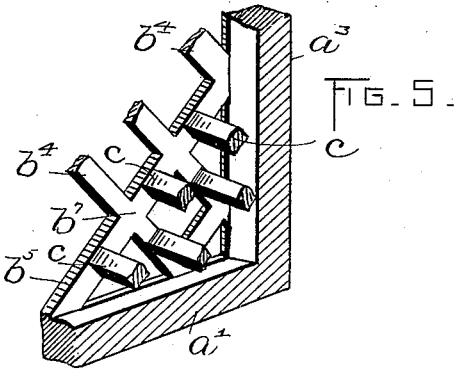
WITNESSES:
A. D. Harrison.
P. W. Pezzetti.
INVENTOR:
Frank R. Wiley
by Wright, Brown & Quinby
Attys.

UNITED STATES PATENT OFFICE.

FRANK R. WILEY, OF MALDEN, MASSACHUSETTS, ASSIGNOR, BY DIRECT AND MESNE ASSIGNMENTS, TO THE WILEY ELECTRIC COMPANY, OF MAINE.

ELEMENT FOR ELECTRIC BATTERIES.

SPECIFICATION forming part of Letters Patent No. 640,727, dated January 2, 1900.

Application filed May 13, 1898. Serial No. 680,554. (Specimens.)

*To all whom it may concern:*

Be it known that I, FRANK R. WILEY, of Malden, in the county of Middlesex and State of Massachusetts, have invented certain new and useful Improvements in Elements for Electric Batteries, of which the following is a specification.

This invention has relation to electric batteries of the primary or secondary types, and more particularly to conducting elements therefor, having for its object to provide an element which shall be as light and compact as possible and at the same time be adapted to contain a maximum amount of compressed oxid of lead or other filling or active material placed therein.

My invention consists of certain improvements in construction, all as I have illustrated upon the drawings and shall now proceed to describe in detail, and finally point out in the claim hereto appended.

Reference is to be had to the accompanying drawings, and to the letters marked thereon, forming a part of this specification, the same letters designating the same parts or features, as the case may be, wherever they occur.

Of the drawings, Figure 1 represents the anode and the cathode of a storage battery the plates of which embody my invention. Fig. 2 represents a longitudinal vertical section through one of the plates, taken on the line 2 2 of Fig. 3. Fig. 3 represents a transverse section of the same on the line 3 3 of Fig. 2. Fig. 4 represents a front face view of one of the plates. Fig. 5 represents a perspective portion of a corner of the plate with the front face removed.

My improved plate or electrode is cast, pressed, or molded of lead or other suitable substance and, as shown, is rectangular, though its external shape or configuration is not material to the invention. The top, bottom, and side edges $a$ $a'$ $a^2$ $a^3$ constitute a solid frame, while the front face $a^4$ and the rear face $a^5$, which are integral therewith, are in the form of grids, the space between the two faces being substantially hollow and being adequate to receive the filling or active material. The front face consists of two series of parallel bars $b$ $b'$, the bars $b$ of one series intersecting the bars $b'$ of the other series at $b^2$ to form diamond-shaped apertures $b^3$, and the rear face consists of similar intersecting bars $b^4$ $b^5$, the intersection $b^3$ of the bars of the front face being opposite the apertures $b^6$ in the rear face, and vice versa.

Midway between each intersection $b^3$ or $b^7$ the bars on both faces are connected by posts or cross-bars $c$, whereby the faces are strengthened and prevented from warping and breaking during the electrolytic process.

From the description which I have thus far given it will be seen that I have provided a hollow plate in which a large amount of oxid of lead or other substance may be stored. The intersections of the bars in the one plate facing the apertures in the other plate provides a backing for the compressed lead oxid or other substance to retain it against displacement, while the connecting posts or bars firmly unite the front and rear faces together without taking up much space.

The connecting posts or bars are cast integrally with the grids, and they are arranged midway between the intersections of the opposing bars $b$ $b'$ $b^4$ $b^5$. The last-mentioned bars are strongest at their intersections, and, consequently, as the cross-bars connect each bar of one grid at points between its intersection with the transversely-arranged bars of the other grid intermediate of their intersections the bars $b$ $b'$ $b^4$ $b^5$ are unable to bend or break at their weakest points.

Having thus explained the nature of my invention and described a way of constructing and using the same, though without attempting to set forth all of the forms in which it may be made or all the modes of its use, what I claim, and desire to secure by Letters Patent, is—

A conducting element for an electric battery, having separated integral front and rear grids, the intersections of the bars of one grid being opposite the apertures of the other grid, said element also having cross-bars connecting said grids, each cross-bar connecting one of the bars of one grid at points between its intersections, with transversely-arranged bars of the other grid, intermediate of their intersections, substantially as described.

In testimony whereof I have affixed my signature in presence of two witnesses.

FRANK R. WILEY.

Witnesses:
 MARCUS B. MAY,
 P. W. PEZZETTI.